May 19, 1925.   1,538,387
H. C. DOOLIN
AUTOMATIC GEAR SHIFTING DEVICE
Filed Sept. 7, 1921   6 Sheets-Sheet 1
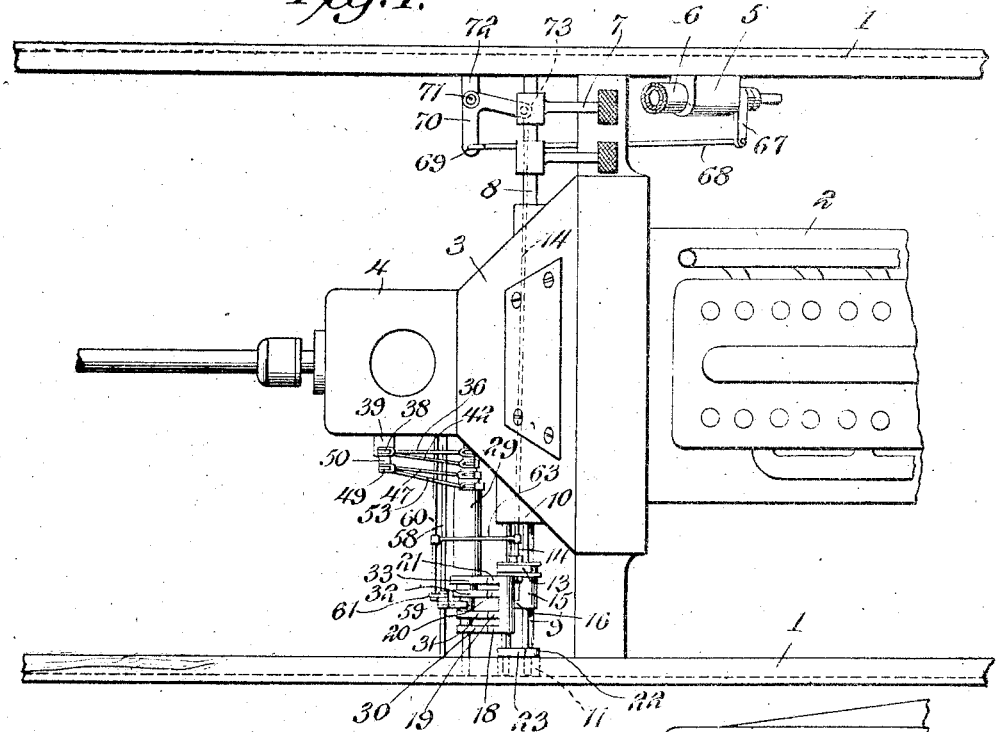
WITNESSES
Howard D. Orr
Harry E. Seidel
H. C. Doolin, INVENTOR.
BY
ATTORNEY

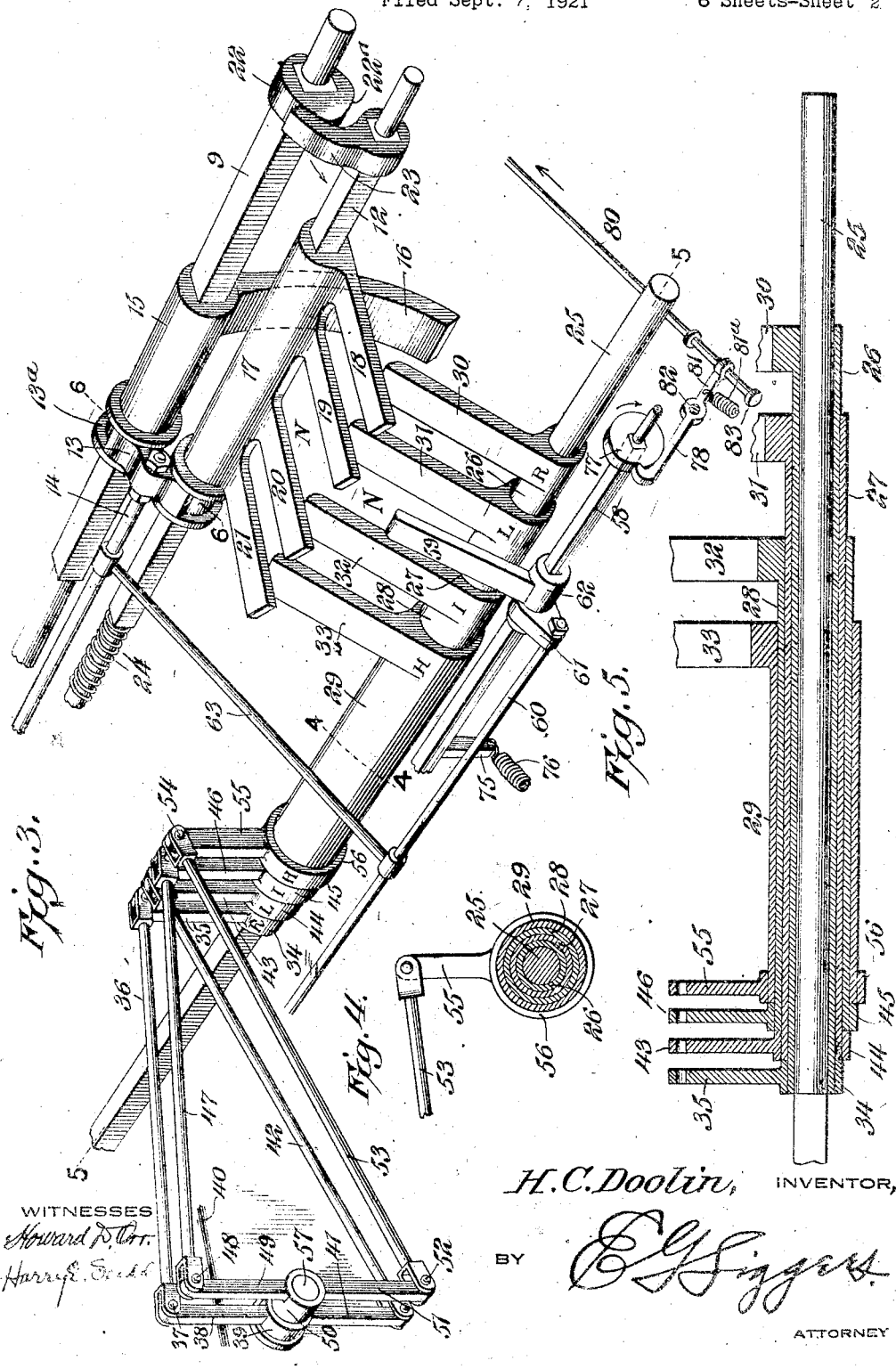

May 19, 1925. 1,538,387
H. C. DOOLIN
AUTOMATIC GEAR SHIFTING DEVICE
Filed Sept. 7, 1921 6 Sheets-Sheet 3
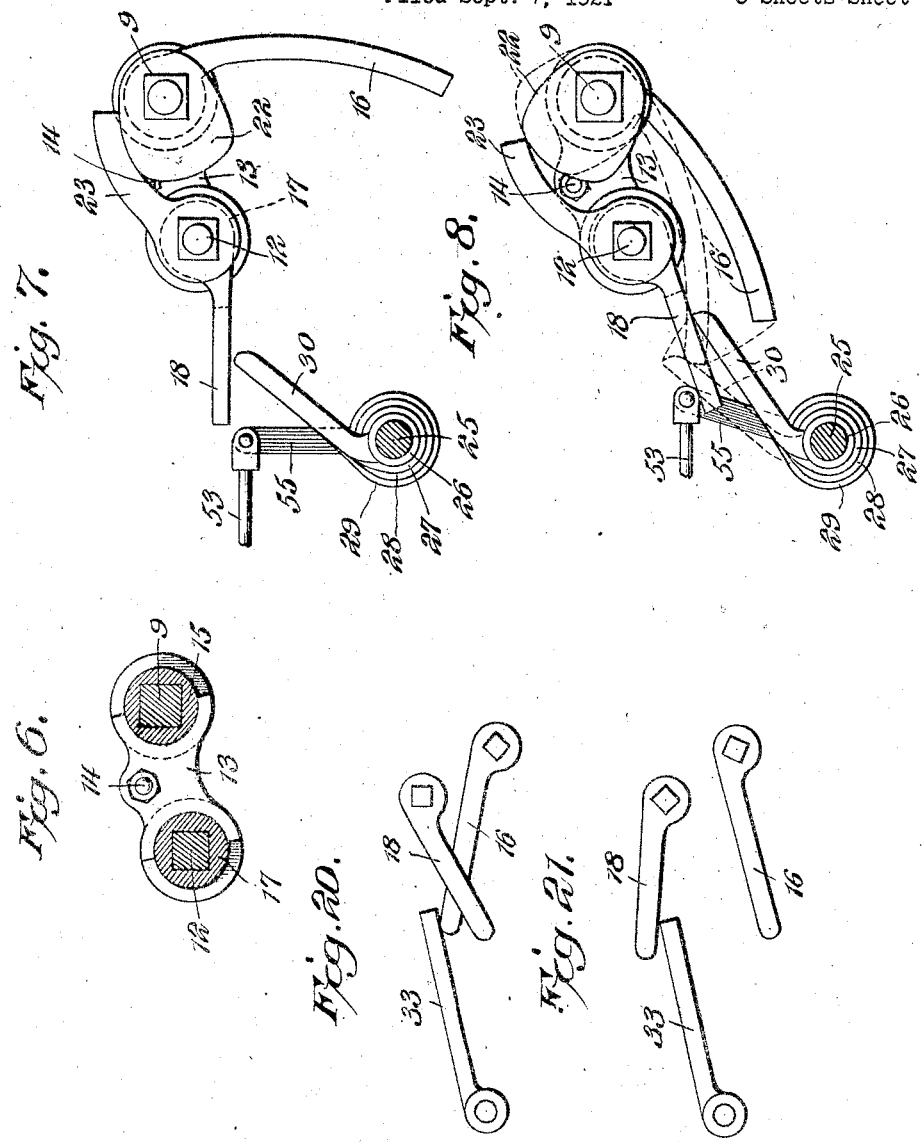

May 19, 1925.  
H. C. DOOLIN  
AUTOMATIC GEAR SHIFTING DEVICE  
Filed Sept. 7, 1921  
6 Sheets-Sheet 4

1,538,387

WITNESSES  
Howard D. Orr.  
Harry E. Seidel

H. C. Doolin, INVENTOR,  
BY  
E. G. Siggers  
ATTORNEY

May 19, 1925.
H. C. DOOLIN
AUTOMATIC GEAR SHIFTING DEVICE
Filed Sept. 7, 1921
1,538,387
6 Sheets-Sheet 5
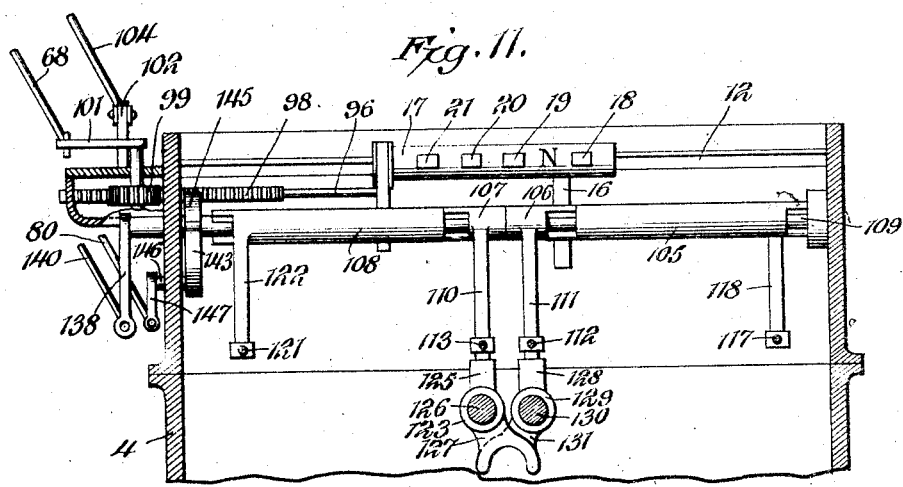
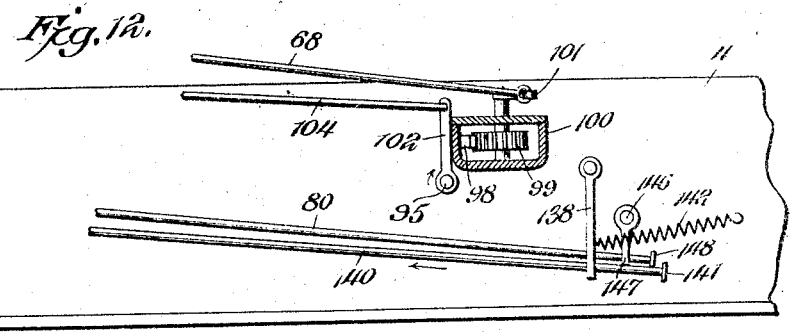
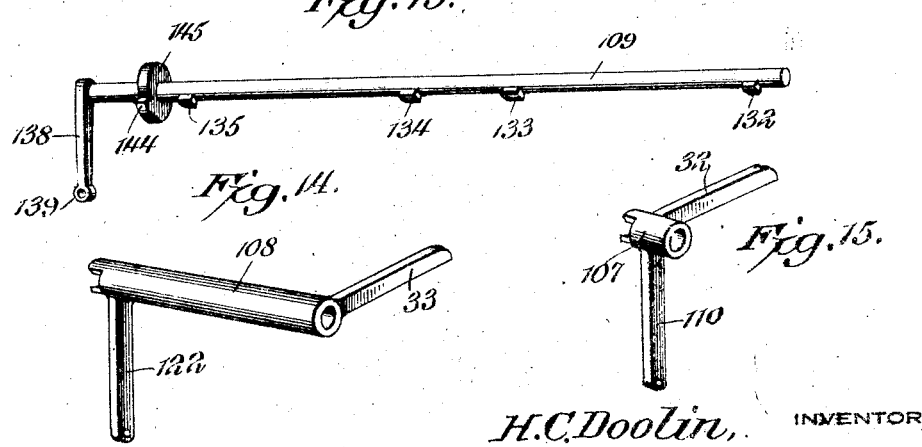
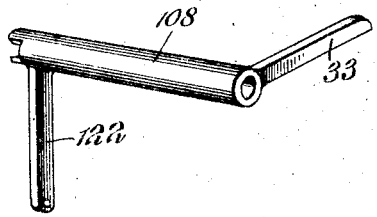
WITNESSES
Howard D. Orr.
Harry E. Seidel
H. C. Doolin, INVENTOR,
BY E. G. Siggers
ATTORNEY

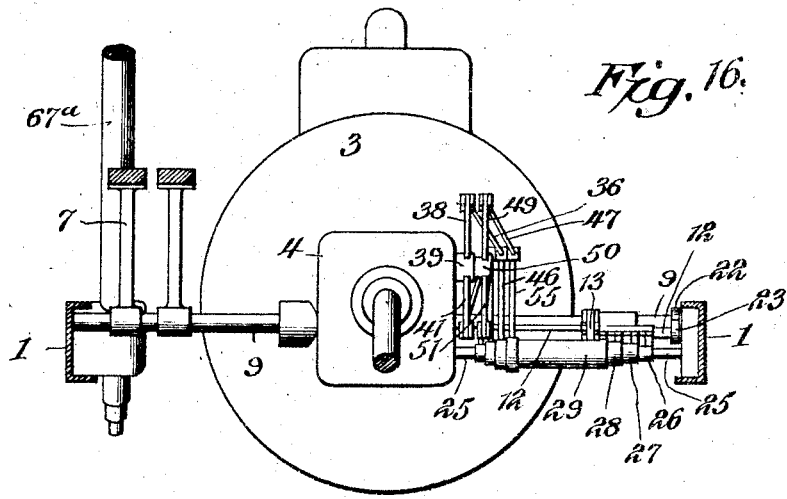
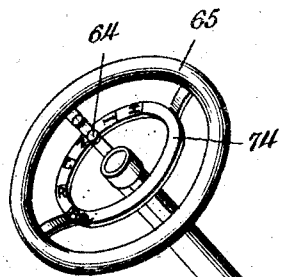
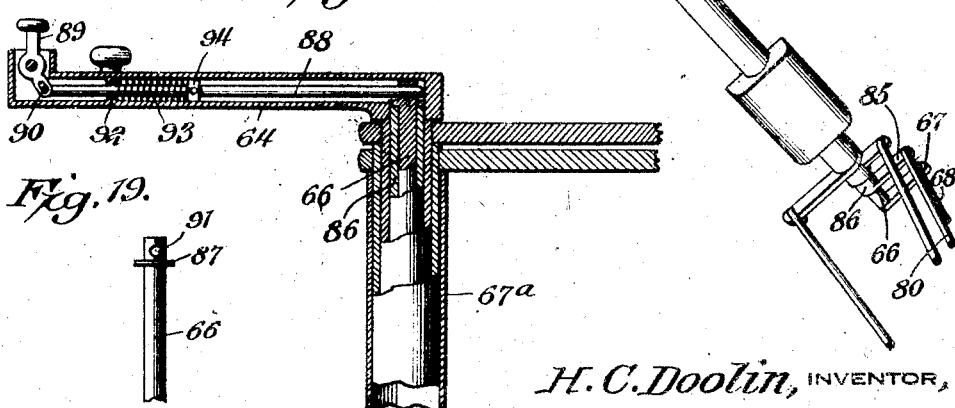

Patented May 19, 1925.

1,538,387

UNITED STATES PATENT OFFICE.

HIRAM CLIFTON DOOLIN, OF ALBANY, MISSOURI.

AUTOMATIC GEAR-SHIFTING DEVICE.

Application filed September 7, 1921. Serial No. 499,019.

*To all whom it may concern:*

Be it known that I, HIRAM C. DOOLIN, a citizen of the United States, residing at Albany, in the county of Gentry and State of Missouri, have invented a new and useful Automatic Gear-Shifting Device, of which the following is a specification.

This invention relates to a gear shifting device, and is more particularly directed to a mechanism for shifting the gears of automobiles by means of a lever on the steering wheel.

An object of the invention is to provide a new and improved mechanism for shifting gears, which is connected to the clutch-operating means, which is automatic in character, and which may be manually operated by a lever located on the steering wheel.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 1 is a fragmentary plan view of an engine and its transmission showing my improved operating mechanism connected thereto.

Fig. 2 is a side view of the same.

Fig. 3 is a view in perspective of my improved operating mechanism of the gear changing device.

Fig. 4 is a cross sectional view taken along the line 4—4 of Fig. 3.

Fig. 5 is a longitudinal section taken along the line 5—5 of Fig. 3.

Fig. 6 is a cross section along the line 6—6 of Fig. 3.

Fig. 7 is a fragmentary end view in detail disclosing the position of the operating levers shown in Fig. 3, when the gears are in low.

Fig. 8 is an end view of the same disclosing the position of the operating levers as the gears are changed to neutral position.

Fig. 11 is a transverse view taken along the line 11—11 of Fig. 9.

Fig. 12 is a fragmentary side view of the traction disclosed in Fig. 9.

Fig. 13 is a view in perspective of the shaft upon which the gear shifting levers are mounted.

Figs. 14 and 15 are views in perspective of the shifting levers mounted upon sleeves.

Fig. 16 is an end view of the gear shifting device applied to an automobile.

Fig. 17 is a perspective of the steering wheel.

Fig. 18 is a vertical section of the upper end of the steering post and selective lever for setting the mechanism to shift the gears.

Fig. 19 is a view in detail, the upper end of one of the operating rods located in the steering column.

Fig. 20 is a detail view of the position of the gear shifting levers when the gears are in high and the clutch is released.

Fig. 21 is a detail view of the position of the gear shifting levers when the gears are in high and the clutch is in.

Figure 9:
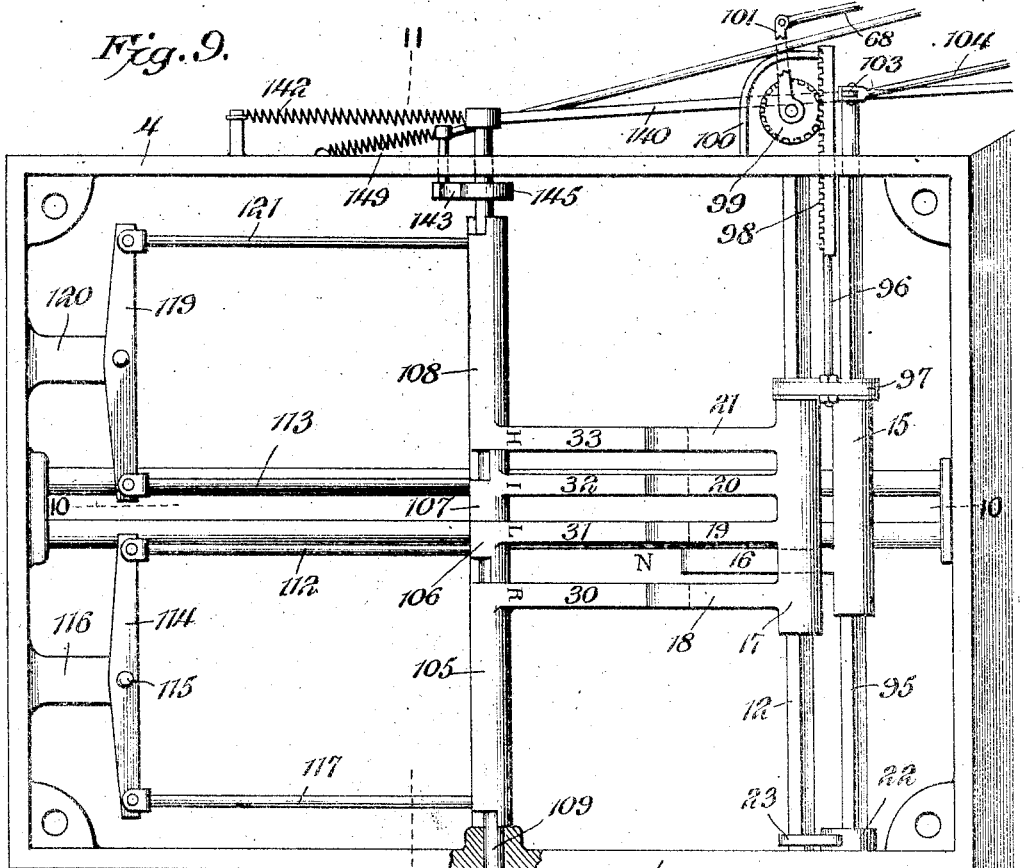
Fig. 9 is a plan view of a modification of my gear changing device.

Referring to the drawing, 1 designates the side members of the frame of an automobile and between which is mounted an engine 2 having a rearwardly located clutch casing 3 and a gear casing 4. A bracket 5 mounted upon a side member 1 carries the steering post 6. A clutch pedal 7 is rigidly secured to a clutch shaft 8 which extends through bearings in the clutch casing 3. The clutch shaft 8 is provided with a squared extension 9 projecting outwardly from the opposite side of the clutch casing 3 and is mounted in bearings located in an extension 10 of the clutch casing 3, and at its outer free end in bearings 11 secured to the side member 1. A countershaft 12 is likewise mounted in bearings in the extension 10 of the casing at one end, and at its opposite end in the bearing 11 secured to the frame 1. A flanged collar 13ª, slidably mounted on the shafts 9 and 12 and operated through a yoke 13 and a rod 14, which is connected to an operating lever on the steering post for shifting the collar 13ª, is provided with the integrally formed sleeve 15 having the downwardly-extending lever 16, the sleeve 15 being slidably mounted on the squared shaft 9 with the yoke 13.

Another sleeve 17, provided with outwardly-extending fingers or releasing levers 18, 19, 20, 21, is integrally connected to the collar 13ª and likewise slidably mounted upon the shaft 12. It will be noted that because of the integral mounting of the sleeves with the collar 13ª they will be shifted on their respective shafts at the same time and through the same distance. The two outer end releasing levers 18 and 19 are spaced from each other, as are the levers 20 and 21, but the levers 19 and 20 are provided with a greater space between them than any other pairs of levers. The lever 16 is located adjacent and below this wider or neutral space between the levers 19 and 20, and when the clutch pedal 7 is depressed, the lever 16 will ride upwardly and partially pass between the levers 19 and 20 when all the gears are in neutral.

Upon the outer end of the squared shaft 9 is securely mounted a cam 22 adapted to be in constant engagement with a finger 23 which is operated by the cam. A spring 24 upon the inner end of the shaft 12 tends to rotate the shaft and constantly urge the finger 23 toward the cam 22 and thereby hold the lever and cam in engagement at all times so that when the shaft 9 is rotated the cam will force finger 23 outwardly and rotate the shaft 12.

Spaced from the shaft 12 and in parallel relation thereto is a shaft 25 provided with rotatably and concentrically mounted sleeves 26, 27, 28, 29, each having respectively an outsanding lever or finger 30, 31, 32, 33, respectively, spaced from each other and which extend towards the shaft 12, the free ends of the levers being spaced below the free ends of the levers 18, 19, 20, 21, when the clutch has been thrown in and all the gears are in neutral as is shown in Fig. 3. Levers 31 and 32, like levers 19 and 20, have a greater space between them than any other pairs of the levers. The width of the space between levers 31 and 32 is equal to the width of the space between levers 19 and 20.

Upon the opposite ends of said sleeves are mounted collars provided with integrally formed upstanding levers. The sleeve 26 is provided with the collar 34 and the integrally formed lever 35, the lever 35 being pivotally connected at its upper free end to a rod 36, the rod in turn being pivotally connected at its other end at 37, to a shifting lever 38 mounted upon a sleeve 39. The sleeve 39 extends within the gear casing 40 and is adapted to operate one of a pair of shifters for moving the reversing gear into mesh with a gear on the drive shaft of the engine, and thereby controlling the speed of the automobile. Extending downwardly from the sleeve 39 is a lever 41 which is in alinement with the lever 38 having the link 42 pivotally connected at one end to the outer free end of the lever 41, the other end of the rod or link being pivotally connected to an upstanding lever 43 integrally mounted upon the collar 44 which is secured to one end of the sleeve 27 and operated by the lever 31.

The sleeve 28, at one end, is also provided with a collar 45 having an upstanding lever 46 integrally secured thereto and opposite to the integrally formed lever 32. Upon the outer free end of the lever 46 is pivotally mounted one end of a link 47, the other end of the link being pivoted at 48 to the outer free end of an upstanding lever 49 which is integrally mounted upon a sleeve 50. The lever 51 is formed integrally with and projects downwardly from the sleeve 50, and in vertical alinement with the lever 49, the outer free end of the lever 51 being pivotally connected at 52 to one end of a link 53, the other end of the link being pivoted at 54 to an upstanding lever 55 integrally formed with a collar 56 secured to one end of the sleeve 29 and operated by the lever 33 through said sleeve.

The sleeve 50 is mounted upon the shaft 57 and concentric within the sleeve 39, and is adapted to operate a shifter located within the gear casing 40 for controlling the shifting of the high speed gear through the lever 51, link 53, lever 55, and the finger 33 when the same is elevated by the clutch shaft lever 16. Each one of the levers 30, 31, 32, 33, respectively, is operated by the lever 16 which is slidably mounted upon the extension 9 of the clutch shaft when the clutch is released and the clutch pedal is depressed.

It will be found that there will be times when the releasing levers 18, 19, 20, 21 will fail utterly to return the levers 30, 31, 32, 33, to their normal neutral position due to the fact that the operator of the car has failed to re-set the levers 16, 18, 19, 20 and 21, before he has stopped his machine and it is therefore necessary to employ an auxiliary releasing means to return any one of the levers 30, 31, 32, 33, which are elevated above their normal neutral position.

A square shaft 58 is rotatably mounted in parallel relation with the shaft 25. Slidably mounted upon the shaft 58 is an auxiliary releasing lever 59 which is adapted to be moved along the shaft 58 by means of a rod 60 being secured to the arm 61 which is loosely mounted upon one end of the sleeve 62, said sleeve being formed integrally with the lever 59 and having the squared opening through which the shaft 58 is inserted.

Rod 60 and rod 14 are located in parallel relation and connected by the link 63, so that these rods are shifted simultaneously and likewise the shafts respectively connected to said rods. Therefore, lever 59 being in the same plane with lever 16 but at a higher level than said lever, lever 59 will be positioned above that one of the fingers 30, 31, 32 or 33, which happens to be directly over lever 16. Since levers 59 and 16 are located in the same vertical plane, they will be in alinement with the neutral space N.

The rod 14 is shifted transversely of the transmission casing by means of a lever 64 rotatably mounted on the steering wheel 65 and rigidly secured to a rod 66 which is concentrically located within the steering post 67ª of the automobile. The outer end of the rod 66 projects outwardly from the lower end of the steering post and has secured thereon a lever 67, the outer free end of which is pivotally engaged by a link 68, the link extending rearwardly of the automobile and connected at 69 to the outer free end of an arm of a bell crank lever 70 which is pivoted at 71 upon a bracket 72 secured to the side frame 1 of the automobile. The outer free end of the other arm of the bell crank lever 70 is pivotally connected, at 73, to the rod 14 which extends through the clutch casing 3 and is secured to the yoke 13 upon the opposite side of the clutch casing. The lever 64 operates upon a quadrant 74 having certain indicia upon which the lever travels to selectively position the arm of the lever 15 beneath any one of the levers 30, 31, 32 or 33, and which are designated by the letters H, I, L and R, to correspond with the different speeds indicated on the quadrant by the same letters, i. e., high, intermediate, low and reverse.

Depending downwardly from the shaft 58 is an arm 75, to the outer free end of which is secured a spring 76, the other end of the spring being secured to some portion of the framework of the automobile, so that said spring will always be under tension and tend to draw the arm 75 rearwardly and cause the disk 77, which is rigidly mounted on the shaft 58 to be rotated in the direction indicated by the arrow in Fig. 3 and force the arm 59 down into engagement with any one of the fingers 30, 31, 32, 33, when the latch 78 is released from its engagement with a notch 79 on the disk 77 through a rod 80 which has a loose connection with the lower end 81 of the latch 78, said latch being pivotally mounted upon a rod 82 which is supported upon the framework of the automobile.

The lower end 81 of the latch 78 is provided with a perforation through which is inserted the rod 80. On the outer end of the rod 80 is formed an enlargement 83 which is engaged by the end 81 of the latch 78, when the rod 80 is reciprocated in the direction indicated by the arrow in Fig. 3. A spring 84 maintains the latch in engagement with the disk 77. It will be seen by this construction that the rod 80 may be moved towards the latch 78 as far as possible without affecting the said latch, but when moved in opposite direction indicated by the arrow will not at the first pull upon the rod 80, operate the latch 78, but will at a predetermined time when the enlargement 83 engages the end 81 of the latch, trip the latch and permit the shaft 58 to be rotated by the pull of the spring 76, as was previously described. The other end of the rod 80 is connected to a lever 85 secured at the lower end of the concentrically mounted sleeve 86 within the steering post 67ª. It will be seen that as the lever 64 is rotated, the rod 66 and likewise the sleeve 86 will be rotated simultaneously, the rotation of the rod 66 being adapted to shift the sleeves 15 and 17 while the rotation of the sleeve will not operate the latch until the lever 64 has passed beyond the reverse position indicated on the quadrant 74 of the steering wheel by reason of the distance normally existing between the enlargement 83 and the end 81 of the latch 78. If the rod 66 and the sleeve 86 were always rotated simultaneously, it will be seen that the lever 16, which is the operating means for the gear shifting levers 30, 31, 32 and 33, could not be maintained in its proper position for tripping one of the gear shifting levers. Therefore, means are employed whereby the rod 66 may be disconnected from the operating lever 64 so that only the sleeve 86 may be rotated to trip the latch 78.

Referring to Fig. 18, the rod 66 is provided with a shoulder 87 which rests upon the upper end of the sleeve 86 and prevents the rod 66 from falling within the sleeve 86, when the disengaging rod 88 is moved rearwardly by means of the pivoted thumb lever 89 which has a loose connection at 90 with the outer end of the rod 88, the inner end of the rod engaging an opening or perforation 91 in the upper end of the rod 66. The collar 92, formed within the hollow lever 64, provides an abutment for the spring 93, the other end of which engages the collar 94 upon the disengaging rod 88, so that the spring 93 will always tend to force the rod 88 inwardly and into the opening 91 of the rod 66.

When the thumb lever 89 is pressed downwardly, the end of the rod 88 is withdrawn from the perforation 91, and the lever 64 may be operated to rotate the sleeve 86 only, so that the rod 80 may be operated independently of the rod 14 which shifts the lever 16 and the levers 18, 19, 20, 21, when the rod 66 is rotated to operate the link 68, the same having connection with the rod 14 through the bell crank lever 70.

Referring to Fig. 3, the lever 59, as has been stated above, is adapted to engage any one of the levers 30, 31, 32, 33, and force it downwardly when the latch 78 is disengaged from the notch 79 of the disk 77, since the pull of the spring 76 will rotate the shaft 58. When the shaft 58 has been rotated a certain distance, the lever 59 is returned to its normal position in the following manner:—

The lever 59 is shifted simultaneously with the lever 16 through the same distance that the lever 16 is shifted; therefore the lever 59 will always be placed above one of the levers 30, 31, 32, 33, under which the lever 16 has been located. When the clutch pedal is depressed and the clutch released, the lever 16 will be elevated and force one of the levers 30, 31, 32 or 33, which is alined with the levers 16 and 59, upwardly, causing the lever 59 to be elevated sufficiently to rotate the shaft 58 and the disk 77 so that the latch 78 will again engage the notch 79 and lock the shaft 58 in spring-pressed position.

The latch 78 is always released after the thumb lever 89 has been depressed to disconnect the rod 88 from the shaft 66 in the steering post, and the lever 64 has been moved over to Re, the releasing position indicated on the quadrant 74, or just beyond R, the position of the lever 64 for reversing the gears. When the lever 64 has been placed in Re position, the rod 80 will have been operated to its fullest extent, rocking the latch 78 and thereby disconnecting the latch 78 from the notch 79 or disk 77, and permitting the shaft 58 to rotate to depress the lever 59. Since the locking rod 88 has been disconnected from the shaft 66, it will be seen that the shaft 66 will remain idle when the sleeve 86 is rotated by the lever 64, so that the position of the lever 16, releasing levers 18, 19, 20, 21, and the auxiliary releasing lever 59, will not be disturbed in their relative position along their respective shafts, but the lever 59 will be depressed since the rotation of the sleeve 86 will operate the rod 80 and trip the latch 78, causing the shaft 58 to be rotated by the spring 76. The lever 59 will then engage and depress any one of the levers 30, 31, 32 or 33, over which the lever 59 has been placed to position that lever in neutral; that is, in such a position that either one of the levers 38 or 49 which happen to be out of the vertical, will be returned to their normal vertical position and thereby shift the gears in the gear box or casing 40 to neutral position.

The operation of the device illustrated by Figs. 1 to 8, inclusive, and Figs. 16 to 19, inclusive, is as follows:—

In Fig. 17, the lever 64, which is adapted to select certain portions of the mechanism for shifting the various gears is located on that portion of the quadrant 74 of the steering wheel marked "Neutral." In this position, the lever 16 has been moved along the shaft 9 together with the releasing levers 18, 19, 20 and 21, on the shaft 12, in order that the lever 16 will be positioned at a point beneath the space between the levers 31 and 32 marked "N" or neutral. Since the clutch pedal operates the shaft 9, the free end of the lever 16 will be elevated when the clutch pedal 7 is depressed, but before it reaches its limit of movement, the cam 22 on the shaft 9 will have been rotated, forcing the finger 23 outwardly in the direction indicated by the arrow in Fig. 3, so that as the finger 23 is forced away from the shaft 9, the levers 18, 19, 20, 21 will be depressed and just barely touch the end of the levers 30, 31, 32, 33, when said levers are in neutral position and in which position they are located as illustrated in Fig. 3. When the cam 22 has forced the finger 23 outwardly to its limit of movement, any further depression of the clutch pedal 7 will have no effect upon the levers 18, 19, 20, 21, because of the shape of the face 22$^a$ of the cam 22, as the finger 23 will ride upon the other inclined surface 22$^a$, but a continued depression of the clutch pedal 7 to its limit of movement causes the end of the lever 16 to be elevated upwardly into the neutral space marked N in Fig. 3, between the pair of gear shifting levers 31 and 32, and the releasing levers 19 and 20. In this instance, no gears are shifted since none of the levers 30, 31, 32, 33, are operated.

It will be seen that as long as the lever 64 is placed upon neutral on the quadrant 74, the foot clutch may be depressed and the lever 16 will be oscillated between the levers 31 and 32 and the levers 19 and 20, without affecting the gears in the gear box.

Suppose the lever 64 to be moved to L on the quadrant 74, which indicates "low gear," the lever 16 and the levers 18, 19, 20, 21 will be shifted along their respective shafts until the lever 16 will fall directly below the lever 31, which lever when elevated will cause the gears in the gear box 40 to be shifted in such a manner that while the engine is running fast the car will travel slowly. Since the lever 16 is located directly beneath the lever 31 and the lever 16 is always opposite the space designated "N" between the levers 19 and 20, the space N will be placed just above the lever 31 and when the clutch pedal 7 is depressed, the arm 16 will be elevated while the levers 18, 19, 20, 21, will be depressed by reason of the cam 22 operating the lever 23 in the direction indicated by the arrow, but since these levers 18, 19, 20, 21 never descend lower than to the position shown in dotted lines in Fig. 7, where the levers 30, 31, 32, 33 are placed in neutral, they will force any one of the levers 30, 31, 32, 33 that happen to be elevated, downwardly to neutral position; but since these levers have been normally in neutral position, there will be none to be depressed by the releasing levers 18, 19, 20, 21. As the clutch pedal 7 is still further depressed, the arm 16 will be positioned just below and in engaging position with the lever 31, while the lever 19 will be just above lever 30, a lever 20 will be located just above the neutral space, and the lever 21 will be above lever 32. A continued depression of the clutch pedal 7 will have no further effect upon the arms 18, 19, 20, 21, since the finger 23 rides on the cam surface 22ª, but the lever 16 is raised, elevating the lever 31 through the space designated N between the releasing levers 19 and 20.

Since the arm 31 is integrally connected with the sleeve 27, and the sleeve 27 has connected with it the upstanding lever 43, the lever 43 will be moved to the left of Fig. 3, when the lever 31 is elevated, so that the rod 42 will be moved in the same direction as will the lever 41 which is connected to the sleeve 39. The lever 38 being rigidly connected to the same sleeve, will be moved inwardly towards the right as will likewise be the connecting rod 36 and the lever 35. The lever 35 being connected to the sleeve 26 and being operated towards the right, will cause the gear-changing lever 30 to be depressed through an angle which is equal to the angle of elevation of the lever 31.

The rotation of the sleeve 39 causes a reciprocation of a shifter which carries a yoke that embraces an annular groove on the low gear, thereby moving said gear into mesh with a gear on the drive shaft and causing movement of the automobile.

As the clutch pedal 7 is released, the clutch is thrown in so that the lever 16 will be returned to its normal position shown in Fig. 3, as will the levers 18, 19, 20, 21, the neutral space N between levers 19 and 20 being slightly above the end of the lever 31. It will be readily seen that as long as the levers 18, 19, 20, 21 are located slightly above the elevated lever 31, that the releasing levers 18, 19, 20, 21 and the lever 16 may be shifted along their respective shafts and not be interfered with in this sliding movement by the lever 31 which is elevated above the plane passing through the levers 32 and 33 when the clutch is in.

If it be desired to shift the gears to what is commonly known as the second speed or intermediate gear, the lever 64 of the steering wheel is rotated and placed directly above the letter I, when the lever 16 and the releasing levers 18, 19, 20, 21 will be shifted transversely of the transmission housing and the lever 16 will be positioned directly beneath the lever 32, with the neutral space N between levers 19, 20 placed over the lever 32. The releasing lever 18 will be stationed over the gear shifting lever 31 which has been previously elevated.

It will be seen in each case, as the releasing levers are shifted the lever 16 is positioned below one of the gear shifting levers 30, 31, 32, 33, and below the neutral space between the levers 19 and 20, so that as the lever 16 is moved upwardly to force one of the operating levers upwardly, it will always operate in the N space between levers 19 and 20. None of the levers 18, 19, 20, 21, will be in the way of the gear shifting lever to be raised.

The lever 16 having been positioned beneath the lever 32, and the releasing lever 18 over the elevated gear shifting lever 31, the clutch pedal 7 is depressed to release the clutch when the releasing arms 18, 19, 20, 21 will be depressed by reason of the action of the cam 22 upon the finger 23, and since the lever 18 has been positioned over the lever 31, it will force the lever 31 down to its normal neutral position shown in Fig. 3, and in full lines in Fig. 8, while the lever 30 will be elevated to the same plane passing through levers 31, 32, 33 by reason of the connections between the levers 30 and 31, namely, the sleeves 26 and 27, levers 35 and 43, operating rods 36 and 42, and the levers 38 and 41.

It may be stated that all the gear shifting levers 30, 31, 32, 33 are always placed in this neutral position when the finger 23 has reached the limit of its movement when acted upon by the cam 22.

At about the time the cam 22 has forced the finger 23 inwardly in a direction indicated by the arrow in Fig. 3, to its limit of movement, the lever 18, together with the releasing lever will have been lowered to their limit of descent while the lever 16 is in engaging relation with the lever 32. A further depression of the clutch pedal results in a continued elevation of the lever 16, but the levers 18, 19, 20, 21 remain stationary once the cam surface 22ª can have no further effect upon the finger 23. The continued upward movement of the lever 16 forces the lever 32 upwardly to a point just below the horizontal plane passing through the normal position of the releasing levers 18, 19, 20, 21, but above the normal neutral position of the levers 30, 31, 32, 33. The clutch pedal 7 may now be released when the shaft 9 is rotated in an opposite direction to that just indicated, and the lever 16 will be returned to its normal position shown in Figs. 3 and 7, with the levers 32 projected upwardly above the normal plane of the levers 30 and 31 but just below the neutral or N space between levers 19 and 20. The lever 33 will be depressed, since said lever is connected to the sleeve 29 which is operated by the lever 55 integrally formed therewith, the rod 53, and the lever 51 which is formed integral with the sleeve 50 that is in turn operated by the lever 49, since the lever 46 has been moved to the left in Fig. 3, through the connecting rod 47, the sleeve 28 and the lever 32. Levers 18, 19, 20, 21 are returned to their normal positions through the action of the cam 22 and finger 23.

The shifting of the gears for high speed is done in the same manner as has just been described for the shifting of the gears to intermediate or low, except that the lever 64 is moved upon the quadrant 7 to the letter H so that the lever 16 and the releasing levers 18, 19, 20, 21 are shifted along their respective shafts until the lever 16 stands beneath the lever 33 and the space designated N between the levers 19 and 20 are above the lever 33. When the clutch pedal 7 is depressed, the lever 19 being located above the lever 32, will be depressed since the cam 22 forced the lever 23 inwardly as indicated by the arrow when shaft 12 is operated and force lever 32 downwardly to its normal position as shown in Fig. 3, while the lever 33 will be raised to its normal neutral position by reason of the connections previously described. But a continued depression of the clutch pedal 7 still further raises the lever 16 and likewise lever 33, as lever 16 is in engagement with lever 33, while lever 32 is depressed by reason of its connection with lever 33 through the following elements: lever 55, rod 53, lever 51, sleeve 50, to the lever 49, rod 47, lever 46, and sleeve 28.

As the lever 33 is just above the lever 16 and below the neutral space N, between levers 19 and 20, lever 16 forces lever 33 upwardly through the neutral space N.

In order to shift the gears to reverse position, the lever 64 is rotated upon the quadrant 74 until it stands above the letter R, so that the lever 16 will be shifted beneath the gear shifting lever R or 30 and the neutral space N beneath the levers 19 and 20. When the clutch pedal is depressed, levers 18, 19, 20, 21 will be depressed first by reason of the cam 22 engaging finger 23, forcing the finger 23 inwardly as indicated by the arrow in Fig. 3, and depressing the releasing levers so that the lever 21 which is sufficiently wide to be located above the lever 33 will engage the said lever in its descent and force the lever back into its neutral position, while the lever 32 will be returned likewise to neutral position by reason of the connection just described. At about the time the lever 23 has traveled its limit in the direction indicated by the arrow, the lever 16 will engage the lever 30 and cause said lever to be elevated upon a continued depression of the clutch pedal 7, while the lever 31 will be depressed.

It is thought that it is unnecessary to repeat a description of the means for simultaneously operating these two levers so that one is depressed when the other is elevated. The clutch pedal 7 is then released and the clutch is thrown in so that the lever 16 and the releasing levers 18, 19, 20, 21 will be returned to their normal positions shown in Figs. 3 and 7, with the reverse lever elevated above the plane passing through the levers 32 and 33. When the lever 30 or reverse lever is elevated, the lever 35 is moved rearwardly by reason of the connection of the rod 36, forcing the lever 38 rearwardly and thereby moving a shifter which forces the respective gear in the gear casing 40 in its proper position for reversing the automobile.

While I have described a device which will shift the gears automatically through the necessary operation of the clutch pedal, it will be found that there will be times when the device will fail to shift the gears as desired. This happens when the machine is stopped while traveling by releasing the clutch and throwing in the brake before shifting the lever 64 to properly set the gears for starting. Suppose, for instance, that the lever 16 had moved the ever 33 upwardly so that the gears would be in "high," and that the automobile were stopped while these gears were shifted to this position: it would be impossible to start the machine by throwing in the clutch when the engine is running with the gears in high and the automobile at a standstill. The engine would be stalled.

If it were attempted to move the lever 64 to low speed indicated by the quadrant 64, the lever 16 ought to be placed beneath the lever 31 with the neutral space designated N between the releasing levers 19 and 20, above the lever 31. But it must be remembered that as long as the machine is standing still and the engine is running, the clutch pedal stands depressed with the lever 16 engaging the lever 33, while the lever 32 would be depressed. Now, as has been stated, if it were attempted to move the lever 74 to slide the lever 16 to a position beneath the lever 31, the lever 32 being being depressed, would interfere with the shifting of the lever 16, while the clutch is released. The lever 64 as well as levers 16, 18, 19, 20, and 21, cannot be shifted when the clutch is released, but the clutch must be in engagement so that the lever 16 may depend freely below the shaft 9 and out of position where it will not be interfered with by any one of the levers 30, 31, 32, 33.

It becomes necessary therefore to employ some other means to return the levers 30, 31, 32, 33 to their normal neutral position. The shaft 58 is provided with an auxiliary releasing lever 59 which is adapted to be shifted by means of a rod 60 through the connection 61 simultaneously with the lever 16, so that as the lever 16 is positioned below any one of the levers 30, 31, 32, 33, lever 59 will be positioned above the same. In this case, the lever 16 is positioned below and in engagement with lever 33, while lever 59 is positioned above lever 33, since rod 60 is moved transversely of the car by the rod 63 which is connected to the rod 14. The lever 59 is provided with a sleeve having a squared opening through which is inserted a shaft 58, so that as the shaft 58 is rotated, the lever 59 is likewise rotated.

The spring 76, connected to the lever 55 and to the frame of the car, tends to rotate the shaft in the direction indicated by the arrow in Fig. 3, and when the catch 78 is released from its engagement with the notch 79 in the disk 77, the shaft is rotated and likewise the arm 59. When the arm 59 is rotated, it is depressed into engagement with the lever 33 and forces said lever back to its normal neutral position when the clutch is released and the lever 16 is returned to its normal position. In order to release the catch 78, it will be necessary to depress the thumb lever 89 of Fig. 18 to release the locking rod 88 from the rod 66 so that when the lever 64 is then rotated, rod 66 remains idle and only the sleeve 86 is rotated, the lever 16 and levers 18, 19, 20, 21 also remaining idle on their respective shafts. Since sleeve 86 is rotated, lever 85 at the end of the steering post is operated, causing the link 80 to be drawn inwardly until the enlargement 83 engages the end 81 of the latch 78 and trips the latch. The lever 64 must be moved to a position on the quadrant designated by Re, the release position. The lever 64 may be returned to its former position when the spring 93 will force the end of the rod 88 back into the perforation 91 in the shaft 66.

The clutch pedal being depressed and the clutch released, the lever 16 is in engagement with the lever 33. Since the lever 59 engages the lever 33 and tends to depress the lever by reason of the pull of the spring 76, the clutch pedal may be released without danger of stalling the engine, since at the beginning of the return movement the clutch pedal lever 59 will force the lever 33 downwardly and the lever 32 upwardly into their normal neutral positions, so that before the clutch is engaged upon the release of the clutch pedal, all four levers 30, 31, 32, 33 will be in the same plane, thereby placing all the gears in neutral.

Lever 64 having been returned to its former position to permit the rod 88 to lock the shaft 66 in operative relation with lever 64, may now be rotated so that it will rest upon the portion of the quadrant designated by L for low gear when the lever 16 will be shifted on the shaft 9 directly below the lever 31, while the neutral space between the levers 19 and 20 will be above the lever 31, but at the same time, the lever 59 through its connections with the rod 14, is shifted along the levers 33 and 32, and across the neutral space N and directly above the lever 31. When the clutch pedal is depressed and the clutch released, the arm 16 will be elevated, engaging the lever 31 and causing it to be elevated, thereby forcing lever 59 up to its normal position when the latch 78 will engage the notch 79 upon the disk 77 and maintain the lever 59 in its elevated position. While the lever 31 is elevated, the lever 30 is depressed.

It will be readily seen that if the machine is accidentally stopped before the lever 64 is shifted, it will be possible, by means of the lever 59 and its connected mechanism, to restore the levers to neutral position and then shift the gears to the speed desired.

The results achieved by the modification illustrated in Figs. 9 to 15, inclusive, are the same as those produced by the device illustrated by Figs. 1 to 8, inclusive, and the operation of both is practically the same, but instead of providing an auxiliary releasing lever which is located upon the outside of the clutch or gear casing, as shown in Fig. 3, the auxiliary means required for shifting the gears to neutral under extraordinary circumstances are all located within the gear casing 4. Instead of the sleeve 15 being located upon the extension of the clutch shaft 9, it is slidably mounted upon a square countershaft 95, journaled in the gear casing 4 and provided with the operating lever 16. The shaft 12 is parallel to the shaft 95 and is provided with the slidable sleeve 17 having the horizontally-extending arms 18, 19, 20, 21, with the neutral space designated by N located between the releasing arms 18 and 19, instead of between 19 and 20 of the other construction. A rod 96 connected to the yoke 97 is provided with a rack 98 which is engaged by the teeth of a pinion 99 pivotally mounted within a bracket 100 and provided with a rigid operating arm 101. The rod 68 is pivotally connected at one end with the operating arm 101 and at its other end to the lever 67 secured to the rod 66 mounted within the steering post 67ª, so that as the lever 64 is rotated, the pinion 99 will be rotated and operate the rack 98 to shift the sleeves 15 and 17 to their various positions for changing the gears. The shaft 95 has an upstanding arm 102 connected to the collar 103 secured upon the outer end of the shaft 95. A rod 104 is connected at one end to the free end of the arm 102, the other end of the rod being connected to a lever integrally mounted upon or secured to the clutch shaft so that as the clutch shaft is operated, the shaft 95 will be similarly and simultaneously rotated.

The levers 30, 31, 32, 33 are respectively mounted integrally with the sleeves 105, 106, 107, 108, which are in turn rotatably mounted upon a shaft 109 journaled in the sides of the gear casing 4.

Depending downwardly from the sleeves 106, 107, respectively, are the arms 110, 111 to which are pivotally connected, near their lower ends, rods 112, 113. A lever 114 is pivotally mounted at 115 upon a bracket 116 secured to the rear wall of the gear casing 4. The rear end of the rod 11 is pivotally connected to one free end of the lever 114, while a rod 117 is pivotally connected to the other free end of the oscillating lever 114, the inner end of the rod 117 being connected to the depending arm 118 mounted upon the sleeve 105. The rod 113 is connected to one of the outer free ends of the oscillating lever 119 which is pivoted to a bracket 120 that is likewise secured to the rear end of the gear casing 4. The other free end of the lever 119 is pivotally connected to a rod 121, the other end of the rod being connected to the lower end of a depending lever 122 which is integrally connected to the sleeve 108.

Lever 110, when oscillated, is adapted to shift the collar 123 through the end 124 of the lever 100 engaging a fork 125 mounted upon the collar 123. The collar 123 is rigidly mounted upon the rod or shifter 126 and provided with a depending yoke 127 adapted to engage a gear and shift the same within the gear casing. The depending lever 111 likewise engages a fork 128 integrally mounted upon a collar 129, the collar being rigidly mounted upon a rod or shifter 130 and carrying the depending yoke 131 so that when the lever 111 is oscillated the shifter rod 130 and the yoke 131 is shifted, moving a gear in the gear casing.

Figure 10:
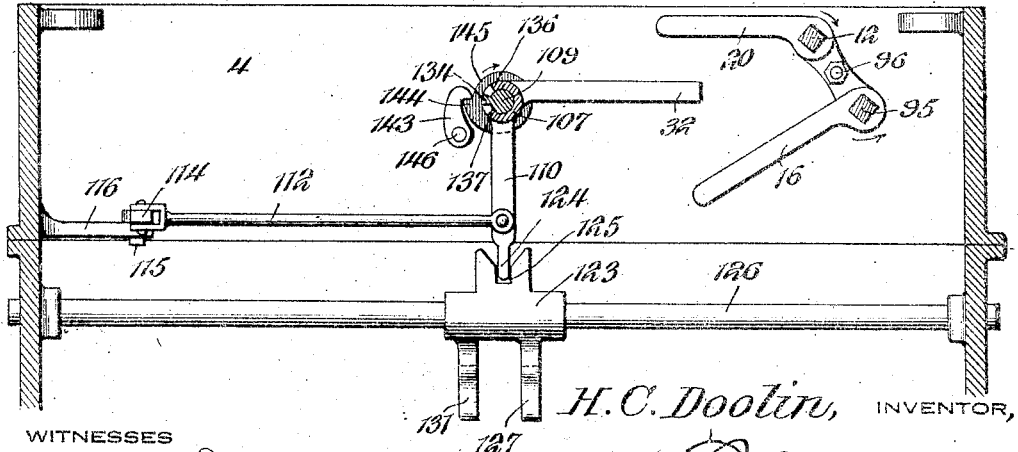
Fig. 10 is a longitudinal view in section along the line 10—10 of Fig. 9.

The shaft 109 is provided with outstanding lugs 132, 133, 134, 135 which project through the respective slots cut in the sleeves 105, 106, 107, 108 and are adapted to be engaged by the edges 136, 137, Fig. 10, of the slotted portions of the sleeves, as the levers 30, 31, 32, 33 are moved or the shaft 109 is moved. The lugs 132, 133, 134, 135 replace lever 59 shown in Fig. 3 and are adapted to return the levers 30, 31, 32, 33 to their normal positions when the operator has stopped his machine and failed to properly set his gear for starting.

The shaft 109 is caused to be rotated in the following manner:—

A lever 138, Figs. 11, 12 and 13, is secured to the end of an extension of the shaft 109 which projects outwardly through the casing 4. Through the perforated lower end 139 of the lever 138 is inserted a rod 140 having the enlargement 141 to prevent the rod 140 and the lever 138 from becoming disconnected and at times to engage the lever 138 to operate said lever. A spring 142 connected to the lever 138 is also connected to the casing 4, thereby tending to draw the lever 138 rearwardly and rotate the shaft 109 in the direction indicated by the arrow in Fig. 10. The rod 140 is connected to a lever depending from the clutch shaft and is operated simultaneously with the rod 104 which operates the shaft 95 to return the lever 138 to its normal vertical position whenever the lever engages the enlargement 141 and the clutch shaft is operated. It will be seen by the loose connection between the lever 138 and the rod 140, that the lever 138 may be moved rearwardly by means of the spring 142 without moving the rod 140, but said rod may readily return the lever 138 to its normal vertical position when the rod is operated to the left as indicated by the arrow in Fig. 12, by the clutch shaft, but only when the enlargement 141 engages the lever 138. The lever 138 only engages the enlargement 141 when the latch 143 has been released from the catch 144, which projects from the collar or disk 145 rigidly mounted on the shaft 109, and the spring 148 is free to rotate the shaft 109 and lever 138.

The latch 143 is rigidly mounted upon a shaft 146, which shaft is operated through an arm 147 and rod 80 which connects with the lever 85 projecting outwardly from the sleeve 86 that is mounted concentrically within the steering post 67ᵃ and operated by the lever 64, when the lever is moved to the release position on the quadrant 74 of the steering wheel.

The rod 80 is adapted to be slidably mounted in the lower end of the lever 147 and is provided with an enlargement 148 adapted to engage the lever 147 when the lever 64 on the steering wheel has been moved to a point slightly beyond the reverse position indicated on the quadrant 74 so that as the lever is moved to the release position, the latch 143 will have become disengaged from the catch 144, to permit the spring 142 to rotate the shaft 109 and operate one of the levers 30, 31, 32, 33, and place it in its neutral position. A spring 149 secured to the side of the casing 4 and to the end of the depending lever 147, tends to draw the lever 147 rearwardly in order to maintain the latch 143 in constant engagement with the disk 145. The distance between the lever 147 and the enlargement 148 represents the distance through which the lever 64 travels.

The operation of the modified form is in every respect identical with the operation of the device illustrated by Figs. 1 to 8, inclusive, with the exception that the shaft 95 is a separate and distinct shaft and not an extension of the clutch shaft, but is operated by a rod 104 connected to a lever 102 which is integrally formed with the shaft 95, the other end of the rod 104 being connected to a lever on the clutch shaft.

While the mechanisms, including the rack 98 and the pinion 99 for shifting the sleeves 15 and 17 on their respective shafts, are slightly different, yet it is merely another form that might be employed for sliding the sleeves 15 and 17 on their respective shafts.

It is also seen that the neutral space designated by N in Fig. 9 is located between the fingers or levers 18 and 19, instead of between the levers 19 and 20, as disclosed in Fig. 3. This change nevertheless is unimportant, since the neutral space may be located between any adjacent pair of the levers as long as the operating lever 16 is disposed below the neutral space in order that the lever 16 may elevate any of the levers 30, 31, 32, 33, inclusive, upwardly and through said space.

It may be stated here that it is entirely unnecessary to employ separate releasing levers such as 18, 19, 20, 21, but a plate may be used instead, which is provided with a slot or neutral space designated as N, and the plate may be extended sufficiently to include any other levers which will give still different variations of speeds, or additional levers may be formed upon the sleeve 17 to take care of any intermediate speeds that are sometimes employed on an automobile.

It will be unnecessary to further describe the operation or the relative position of the levers 16, 18, 19, 20, 21, and 30, 31, 32, 33, since it is thought this has been fully described with reference to Figs. 1 to 8, inclusive; nevertheless it may be stated that in Fig. 10, the lever 32 is shown in its normal neutral position. The location of lever 20 describes the horizontal inoperative position of the levers 18, 19, 20, 21, while the lever 16 designates the normal position of the operating lever when the clutch has been thrown in.

Referring to Fig. 10, if any one of the levers 30, 31, 32, 33, inclusive, has been previously elevated by the lever 16, by the release of the clutch and the depression of the clutch pedal, the arm 20 will descend while the lever 16 ascends, but since the quick-acting cam 22 operates the lever 23 early in the revolution of the shaft 95, the lever 20 will immediately descend and position the lever 32 to its normal neutral position just before the lever 16 is elevated to engage the lever 32. A continued depression of the clutch pedal for releasing the clutch, will cause the lever 16 to continue its ascent and elevate the lever 32 or any other lever that may have been above the lever 16 through the neutral space between levers 18 and 19, while levers 18, 19, 20, 21, inclusive, remain inactive. Instead of employing a separate lever, which is shifted simultaneously with the lever 16, a new structure has been designed for accomplishing the same purpose.

If any one of the levers 30, 31, 32, 33, have been elevated, say lever 33, by the lever 16, Fig. 20, and the automobile has been stopped, the clutch will have been released and the clutch pedal depressed, thereby returning the lever 16 and the lever 18 to the position shown in Fig. 21.

It must be remembered to accomplish the proper results that the lever 16 and levers 18, 19, 20, 21 should be shifted when the clutch has been thrown in and the clutch pedal has been released, so that when the clutch is released and the pedal depressed, the fingers 18, 19, 20, 21 will be operated to depress any one of the levers 30, 31, 32, 33, while the lever 16 will be elevated to elevate any one of the levers 30, 31, 32, 33, corresponding to the speed desired and beneath which the lever 16 has been located by the selective lever 64 on the steering wheel. Otherwise, as stated above, lever 33 would be operated between levers 18 and 19, by the lever 16 instead of being placed in vertical.

Now, if any one of the levers 30, 31, 32, 33, is left in an elevated position when the automobile is stopped, such as gear shifting lever 33, the clutch having been released, it will be impossible to shift sleeves 15 and 17 to change the speed from high to low gear so that the automobile may properly be started again. If the gears are still in high and the clutch is thrown in, the engine will be stalled for it is always necessary to change the speed to low except in exceptional circumstances.

If, as seen in Fig. 10, the arm 32 were elevated the edge 136 of the slot in the sleeve 107 would be in engagement with the lug 134. Now, if the thumb lever 89, shown in Fig. 18, were depressed, the locking rod 88 would be relieved from its connection with the rod 66 so that when the lever 64 is rotated to released or Re position, the rod 66 would not be operated, and therefore the collars 15 and 17 would not be shifted, but the sleeve 86 would be rotated by reason of its connection with the lever 64 and thereby operate the lever 85 secured to the end of the sleeve 86. The rod 80 would likewise be shifted forwardly while the lever 64 is passing over the different letters H, I, N, L and R on the quadrant of the steering wheel before the enlargement 148 would engage the lever 147. When the lever 64 will have passed the reverse position shown on the quadrant 74 of the steering wheel, the enlargement 148 would begin to pull upon the lever 147 and withdraw the latch 143 from the notch 144. When this happens, the shaft 109 will be rotated in the direction indicated by the arrow in Fig. 10, and since the projection 134 is engaging with the edge 136 of the slot within the sleeve 107, the lever 32 would be forced downwardly and tend to force lever 16 downwardly. When the clutch is thrown in, lever 32 would be forced into its normal neutral position. Since all the gears are in neutral, the clutch being in has no effect whatever on the automobile. Since all of these slots in the different sleeves are in the same horizontal plane and all lugs 132, 133, 134, 135, are in the same horizontal plane, they will operate any of the levers when they have been placed in their elevated position for moving the gears in the gear casing.

It must be understood, however, that only two levers, that is 32 and 33, are operated simultaneously but in opposite directions by the lugs 134 and 135, for the reason that when the lever 32 is elevated, the edge 136 of the groove in the sleeve 107 and the lug 134 are in engagement, while the edge 137 of the groove in the sleeve 108 and the lug 135 are in engagement, but since these levers are so connected that they are simultaneously operated, the operation of the lever 32 by means of the lug 134 of the spring-pressed shaft 109 will also operate the lever 33. Levers 30 and 31 are maintained in neutral position while lugs 132 and 133 are operated in their respective slots but since these lugs are positioned midway in the slots of the sleeves 105, 106, as shown in Fig. 10, they can be operated in either direction while engaging the edges 136 or 137.

It will be necessary to employ some means to return the shaft 109 to its normal position so that it will always be ready to return any one of the shafts 30, 31, 32, 33, when necessary. This is accomplished by means of an arm 138 depending from the shaft 109 and connected by a rod 140 to a lever projecting from the shaft 95. When the clutch pedal is released, the shaft 95 will be rotated in the direction indicated by the arrow in Fig. 10, rotating the shaft 109 in the reverse direction as indicated by the arrow in Fig. 10, and causing the collar 145 to be rotated in the same manner and sufficiently for the catch 144 to slip beneath the latch 143 and lock the shaft in position. The enlargement 141 on the end of the rod 140 always engages the levers 138 when the latch 143 has been sprung, for the spring forces lever 138 rearwardly.

What is claimed is:—

1. In a gear changing mechanism for automobiles, a clutch, means for operating the clutch, a plurality of gear shifting levers normally holding the gears in neutral position, plurality of gear releasing means for returning the gear shifting levers to neutral position, and means operable upon the release of the clutch for operating one of the gear releasing means and the gear shifting levers.

2. In a gear changing mechanism for automobiles, a clutch, means for operating the clutch, a plurality of gear shifting levers normally holding the gears in neutral position, a plurality of gear releasing means for returning the gear shifting levers to neutral position, and means operable upon the release of the clutch for operating a member of the gear releasing means to move the gear shifting levers, to return a gear in operative position to neutral position, and a lever adapted to selectively operate one of the gear shifting levers for operatively positioning another gear for effecting a change in speed.

3. In a gear changing mechanism for automobiles, the combination of a clutch, means for operating the clutch, a plurality of gear shifting levers normally holding the gears in neutral position, gear releasing means operable under certain conditions to return the gear shifting levers to neutral position, auxiliary gear releasing means operable under certain other conditions to return said levers to neutral position, and means actuated upon the release of the clutch for operating the first of said gear releasing means and the gear shifting levers, said first gear releasing means being adapted to be actuated during a portion of the time for operation of the actuating means.

4. In a gear changing mechanism for automobiles, the combination of a clutch, means for operating the clutch, a plurality of gear shifting levers normally holding the gears in neutral position, gear releasing means operable under certain conditions to return the gear shifting levers to neutral position, auxiliary gear releasing means operable under certain other conditions to return said levers to neutral position, and means actuated upon the release of the clutch for operating the first gear releasing means and the gear shifting levers, said first gear releasing means being actuated during the first part of the operation of said actuated means, the gear shifting lever being operated during the remaining portion of the operation of said actuating means.

5. In a gear changing mechanism for automobiles, a clutch, means for operating the clutch, a plurality of gear shifting levers normally holding the gears in neutral position, a gear releasing means for returning the gear shifting levers to neutral position, and means operable upon the release of the clutch for operating the gear releasing means and the gear shifting levers, and an auxiliary releasing means for returning the gear shifting levers to neutral position when the main releasing means fails to return said shifting levers to neutral position.

6. In a gear changing mechanism for automobiles, a clutch, means for operating the clutch, a plurality of gear-shifting levers normally holding the gears in neutral position, a plurality of gear releasing means for returning the gear shifting levers to neutral position, and means operable upon the release of the clutch for operating one of the gear-releasing means, said gear-releasing means being provided with a slot, and means for actuating the gear shifting levers, at times adapted to oscillate in said slot and between certain of the gear shifting levers when the gears are in neutral and the clutch is released.

7. In a gear changing mechanism for automobiles, a clutch, means for operating the clutch, a plurality of gear shifting levers normally holding the gears in neutral position, a plurality of gear releasing means for returning the gear shifting levers to neutral position, one of said gear releasing means being automatically operable, means operable upon the release of the clutch for operating the gear shifting levers, and means for selectively positioning the operating means for the gear shifting levers in operative relation with a gear shifting lever.

8. In a gear changing mechanism for automobiles, a clutch, means for operating the clutch, a plurality of gear shifting levers normally holding the gears in neutral position, a gear releasing means for returning the gear shifting levers to neutral position, said gear releasing means being operable upon the release of the clutch, means operable upon the release of the clutch for actuating the gear shifting levers, means for selectively positioning the operating means for the gear shifting levers in operative relation with a gear shifting lever, and an auxiliary gear releasing means for returning the gear shifting levers to neutral position when said main releasing means fails to return said shifting levers to neutral position.

9. In a gear changing mechanism for automobiles, a clutch, means for operating the clutch, a plurality of gear shifting levers normally holding the gears in neutral position, a gear releasing means for returning the gear shifting levers to neutral position, said gear releasing means being operable upon the release of the clutch, means actuated upon the release of the clutch for operating the gear shifting levers, means for selectively positioning the operating means for the gear shifting levers in operative relation with a gear shifting lever, and an automatic auxiliary gear releasing means for the gear shifting levers, said auxiliary gear releasing means adapted to be simultaneously shifted with the operating means for the gear shifting levers.

10. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, an auxiliary gear releasing means for returning the gear shifting levers when the main releasing means fails to move said shifting levers to neutral position, and means connected to the selective positioning means for operating the auxiliary gear releasing means.

11. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, an auxiliary gear releasing means for the gear shifting levers, means connected to the selective positioning means for operating the auxiliary gear releasing means, and means for disengaging the selective means from the operating means for the auxiliary gear releasing means.

12. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, an auxiliary gear releasing means for the gear shifting levers, and means for selectively positioning simultaneously said gear releasing means, the auxiliary gear releasing means, and the operating means for the gear shifting levers.

13. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, an auxiliary gear releasing means for the gear shifting levers, and means for selectively positioning simultaneously said gear releasing means, the auxiliary gear releasing means, and the operating means for the gear shifting levers, said selective positioning means being provided with means for operating the auxiliary gear releasing means.

14. In a gear changing mechanism for automobiles, the combination of a clutch, means for operating the clutch, a plurality of gear shifting levers normally holding the gears in neutral position, gear releasing means operated upon the release of the clutch for returning the gear shifting levers to neutral position, auxiliary gear releasing means operable under other conditions to return the gear shifting levers to neutral position, means for selectively positioning the operating means for the gear shifting levers in operative relation therewith, and means for causing the gear releasing means to return a gear shifting lever to neutral position in advance of another shifting lever being moved to gear shifting position.

15. In a gear changing mechanism for automobiles, a clutch, means for operating the clutch, a plurality of gear shifting levers normally holding the gears in neutral position, a plurality of gear releasing means for returning the gear shifting levers to neutral position, one of said gear releasing means being automatically operable for actuating the gear shifting levers, and means for selectively positioning the operating means for the gear shifting levers in operative relation with a gear shifting lever, said automatically operated gear releasing means and the operating means for the gear shifting levers being movable toward each other for oscillating the gear shifting levers.

16. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, and a spring-pressed shaft carrying an auxiliary gear releasing means for returning the gear shifting levers to neutral position, the operative means for the gear shifting levers rotating the shaft in one direction against the action of the spring.

17. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, a spring-pressed shaft carrying an auxiliary gear releasing means for returning the gear shifting levers to neutral position, the operative means for the gear shifting levers rotating the shaft in one direction against the action of the spring, a latch automatically gripping the shaft to prevent returning of the shaft, and means connected with the selective positioning means for disengaging the latch from the shaft to permit the spring to rotate the shaft.

18. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, and an auxiliary gear releasing means for the gear shifting levers, said selective positioning means being provided with means for causing the auxiliary gear releasing means to be set in motion.

19. In a gear changing mechanism for automobiles, a clutch, means for operating the clutch, a plurality of gear shifting levers normally holding the gears in neutral position, a gear releasing means for returning the gear shifting levers to neutral position, operable upon the release of the clutch, means operated upon the release of the clutch for actuating the gear shifting levers, means for selectively positioning the operating means for the gear shifting levers in operative relation with a gear shifting lever, and an auxiliary gear releasing means for the gear shifting levers, said selective positioning means being provided with means for operating the auxiliary gear releasing means, the operation of the auxiliary gear releasing means being effective beyond the limits of operation of the selective positioning means.

20. In a gear changing mechanism for automobiles, a clutch, means for operating the clutch, a plurality of gear shifting levers normally holding the gears in neutral position, a gear releasing means for returning the gear shifting levers to neutral position, said gear releasing means being operated upon the release of the clutch for actuating the gear shifting levers, means for selectively positioning the operating means for the gear shifting levers in operative relation with a gear shifting lever, and an auxiliary gear releasing means for the gear shifting levers, said selective positioning means being provided with means for causing actuation of the auxiliary gear releasing means, the operation of the auxiliary gear releasing means being effective beyond the limits of operation of the selective positioning means.

21. In a gear changing mechanism for automobiles, a clutch, a shaft, a clutch pedal for rocking the shaft and operating the clutch, a plurality of oscillating levers having connections with the gear shifters, a lever on the shaft operable upon the release of the clutch for operating the oscillating levers, and a countershaft connected in operative relation with the first-mentioned shaft and provided with a releasing means for returning the oscillating levers to normal position and likewise the gears to neutral position, said countershaft adapted to remain idle during a portion of the rocking movement of the first-mentioned shaft.

22. In a gear changing mechanism for automobiles, a clutch, a shaft, a clutch pedal for rocking the shaft and operating the clutch, a plurality of oscillating levers having connections with the gear shifters for returning said shifters to neutral position, a lever on the shaft operable upon the release of the clutch for operating the oscillating levers, a countershaft provided with a releasing means for returning the oscillating levers to normal position and likewise the gears to neutral position, and a rock shaft provided with an auxiliary releasing means for oscillating the levers when the main releasing means fails to return the gear shifters to neutral position.

23. In a gear changing mechanism for automobiles, a clutch, a shaft, a clutch pedal for rocking the shaft and operating the clutch, a plurality of spaced oscillating levers having connections with the gear shifters, a lever on the shaft operable upon the release of the clutch for operating the oscillating levers, a countershaft operatively connected with the first-mentioned shaft and provided with a releasing means for returning the oscillating levers to normal position and likewise the gears to neutral position during the first part of the rocking movement of the first-mentioned shaft, the operating lever for the oscillating levers adapted to be moved between certain of the oscillating levers when the gears are in neutral during the last part of the rocking movement of the first-mentioned shaft.

24. In a gear changing mechanism for automobiles, a clutch, a shaft, a clutch pedal for rocking the shaft and operating the clutch, a plurality of oscillating levers having connections with the gear shifters, a lever on the shaft operable upon the release of the clutch for operating the oscillating levers, a countershaft provided with a releasing means for returning the oscillating levers to normal position and likewise the gears to neutral position, said releasing means and operating means for the oscillating levers being adapted to be moved toward each other when the clutch is being released, the releasing means returning the oscillating levers to neutral position, the operating means moving one of the oscillating levers to a gear changing position, and an auxiliary releasing means adapted to return an oscillating lever to normal position when the main releasing means is operated without engaging said levers.

25. In a gear changing mechanism for automobiles, a clutch, a shaft, a clutch pedal for rocking the shaft and operating the clutch, a plurality of oscillating levers having connections with the gear shifters, a lever on the shaft operable upon the release of the clutch for operating the oscillating levers, a countershaft provided with a releasing means for returning the oscillating levers to normal position and likewise the gears to neutral position, an auxiliary releasing means for returning an oscillating lever to normal position that has not been moved when the main releasing means has been operated, and means for simultaneously shifting the releasing means in position to return an oscillating lever to neutral position, and the operating lever on the shaft in selective position to move another oscillating lever out of neutral position.

26. In a gear changing mechanism for automobiles, a clutch, a rock shaft, a clutch pedal for rocking the shaft and operating the clutch, a plurality of oscillating levers having connections with the gear shifters, a lever on the shaft operable upon the release of the clutch for operating the oscillating levers, and a countershaft provided with a releasing means for returning the oscillating levers to normal position and likewise the gears to neutral position, the releasing means and the operating lever on the shaft being moved consecutively upon the release of the clutch, and means operatively connecting the shafts and providing an intermittent rotation of the countershaft.

27. In a gear changing mechanism for automobiles, a clutch, means for operating the clutch including a shaft and a pedal, a plurality of gear releasing levers mounted upon a countershaft, a lever mounted on the clutch shaft, the releasing levers and the clutch shaft lever being slidably mounted on their respective shafts and adapted to be shifted simultaneously from the steering wheel in operative positions relative to certain of a plurality of levers rotatably mounted and normally in alinement when all the gears are in neutral, said rotatably mounted levers selectively controlling the shifting of the gears, one of the levers adapted to be moved out of alinement to shift a gear when the clutch is released, and to be returned to normal position by the releasing levers for returning the gears to neutral position, and an auxiliary gear releasing means adapted to be simultaneously shifted with the lever on the clutch shaft and in position to normally return that one of the gear controlling levers which the lever on the clutch shaft has placed in gear shifting position.

28. In a gear changing mechanism for automobiles, a clutch, a shaft, a clutch pedal for rocking the shaft and operating the clutch, a plurality of oscillating levers having connection with the gear shifters, a depending lever on the clutch shaft adapted to operate the oscillating levers, a countershaft provided with a releasing means for returning the levers to normal position and likewise the gears to neutral position, a cam on the clutch shaft engaging a finger on the countershaft and adapted to cause the releasing means to return the oscillating levers during a portion of the movement of the clutch shaft when the clutch is being released.

29. In a gear changing mechanism for automobiles, a clutch, a shaft, a clutch pedal for rocking the shaft and operating the clutch, a plurality of oscillating levers having connection with the gear shifters in the gear casing, a depending lever on the clutch shaft adapted to operate the oscillating levers, a countershaft provided with a releasing means for returning the levers to normal position and likewise the gears to neutral position, a cam on the clutch shaft enagaging a finger on the countershaft and adapted to cause the releasing means to return the oscillating levers during a portion of the movement of the clutch shaft when the clutch is being released, during the remainder of the movement of the clutch releasing means, the finger and cam being adapted to maintain the releasing means for the oscillating levers in an inoperative position while the depending lever forces another oscillating lever to move a gear shifter.

30. In a gear changing mechanism for automobiles, a clutch, a shaft, a clutch pedal for rocking the shaft and operating the clutch, a plurality of oscillating levers having connection with the gear shifters, a depending lever on the clutch shaft adapted to operate the oscillating levers, a countershaft provided with a releasing means for returning the levers to normal position and likewise the gears to neutral position, a cam on the clutch shaft engaging a finger on the countershaft and adapted to cause the releasing means to return the oscillating levers during a portion of the movement of the clutch shaft when the clutch is being released, and means to cause the finger and cam to constantly engage each other and rotate the countershaft in one direction.

31. In a gear changing mechanism for automobiles, a clutch, a shaft, a clutch pedal for rocking the shaft and operating the clutch, a plurality of oscillating levers having connection with the gear shifters, a depending lever on the clutch shaft adapted to operate the oscillating levers, a countershaft provided with a releasing means for returning the levers to normal position and likewise the gears to neutral position, a cam on the clutch shaft engaging a finger on the counter shaft and adapted to cause the releasing means to return the oscillating levers during a portion of the movement of the clutch shaft when the clutch is being released, and an auxiliary releasing means urging the releasing means into engagement with one of the oscillating levers, means restraining movement of the releasing means and means operating from the steering wheel of an automobile for releasing the restraining means.

32. A gear changing mechanism for automobiles, a clutch, means for operating the clutch, a plurality of gear shifting levers normally holding the gears in neutral position, means operated by the clutch for moving the shifting levers to gear shifting position, a gear releasing means for returning the gear shifting levers to neutral position, and means operable upon the release of the clutch for operating the gear releasing means and the means for moving the gear shifting levers, said gear releasing means having a variable movement relative to the means for moving the gear shifting levers.

33. In a gear changing mechanism for automobiles, a clutch, means for operating the clutch, a plurality of gear shifting levers, means for operating the gear shifting levers to gear changing position, means for returning the gear shifting levers to neutral position, means for selectively positioning the operating means for the gear shifting levers, and an auxiliary gear releasing means for the gear shifting levers resiliently held in inoperative position adapted to be tripped for returning the gear shifting lever placed in gear changing position to neutral position.

34. In a gear changing mechanism for automobiles, a clutch, means for operating the clutch, a plurality of gear shifting levers, means for operating the gear shifting levers to gear changing position, means for returning the gear shifting levers to neutral position, means for selectively positioning the operating means for the gear shifting levers, and an auxiliary gear releasing means for the gearing shifting levers resiliently held in inoperative position adapted to be tripped for returning the gear shifting lever placed in gear changing position, said auxiliary gear releasing means adapted to be returned to normal position when the clutch shaft is operated in one direction.

35. In a gear changing mechanism for automobiles, a clutch, means for operating the clutch, a plurality of gear shifting levers, means for operating the gear shifting levers to gear changing position, means for returning the gear shifting levers to neutral position, means for selectively positioning one operating means for the gear shifting levers in position to move one of said levers, and an auxiliary gear releasing means for the gear shifting levers resiliently held in inoperative position adapted to be tripped for returning the gear shifting lever placed in gear changing position, and means connected with the selective means for tripping the auxiliary gear releasing means.

36. In a gear changing mechanism for automobiles, a clutch, means connected with the clutch for shifting the gears, and means connected with the clutch and operated simultaneously with the gear shifting means for returning the gears to neutral position and an automatically operated gear returning means supplementing the first-mentioned gear returning means.

37. In a gear changing mechanism for automobiles, a clutch, means connected with the clutch for shifting the gears, means connected with the clutch and operated simultaneously with the gear shifting means for returning the gears to neutral position in advance of the shifting of the gears by the first-mentioned means, means for selectively positioning the gear releasing means in position to return a gear to neutral position and the gear shifting means in position to shift another gear in operative position, an auxiliary means for returning the gears to neutral position, and means connected with the selective means and adapted to be disengaged therefrom for operating the auxiliary releasing means.

38. In a gear changing mechanism for automobiles, a clutch, means operable upon the release of the clutch for shifting the gears, complementary gear releasing means for returning the gears to neutral position, when one of the complementary gear releasing means is moved to an inoperative position upon the release of the clutch, the other gear releasing means being movable to return the gears to neutral position.

39. In a gear changing mechanism for automobiles, a clutch, a plurality of gear shifting levers, means for operating the gear shifting levers to gear changing position, complementary gear releasing means for operating the gear shifting levers to return the gears to neutral position, the means for operating the gear shifting levers adapted to cause one of the gear releasing means to be moved to an inoperative position relative to the gear shifting levers, with the other gear releasing means likewise being moved to an inoperative position when the gears are in neutral, the first-mentioned gear releasing means being automatically operable to actuate a gear shifting lever for returning the gears to neutral position, and means for preventing the automatic operation thereof while the clutch is released.

40. In a gear changing mechanism for automobiles, a clutch, means for operating the clutch, a plurality of gear-shifting levers normally holding the gears in neutral position, means for operating the gear shifting levers to change the gears, a gear releasing means for returning the gear shifting levers to neutral position, a selective means for positioning the means for operating the gear shifting levers and the gear releasing means relative to a gear shifting lever and adapted to be operated before the clutch is released, and means automatically operable to actuate a gear shifting lever for returning the gears to neutral position when the clutch is thrown in, said last-mentioned means being automatically operable to return the gears to neutral position after the clutch has been released without prior selective positioning of the means for operating the gear shifting levers.

41. In a gear changing mechanism for automobiles, a clutch, means for operating the clutch, a plurality of gear shifting levers normally holding the gears in neutral position, a plurality of gear releasing means for returning the gear shifting levers to neutral position, and means operable upon the release of the clutch for actuating one of the gear releasing means, the latter being provided with a slot, and means for actuating the gear shifting levers, said means adapted to oscillate in said slot, the last-mentioned gear releasing means being automatically operable for engaging and actuating a gear shifting lever to return the gear to neutral position.

42. In a gear changing mechanism for automobiles, a clutch, means for operating the clutch, a plurality of gear shifting levers normally holding the gears in neutral position, a plurality of gear releasing means for returning the gear shifting levers to neutral position, means operable upon the release of the clutch for actuating one of the gear releasing means, the latter being provided with a slot, means for selectively positioning the slot in the gear releasing means in alinement with a gear shifting lever, and means for actuating the gear shifting levers, said means adapted to oscillate in said slot, the second gear releasing means being automatically operable for engaging and actuating the gear shifting lever alined with the slot for returning a gear to neutral position.

43. In a gear changing mechanism for automobiles, a clutch, means for operating the clutch, a plurality of gear shifting levers normally holding the gears in neutral position, a plurality of gear releasing means for returning the gear shifting levers to neutral position, means operable upon the release of the clutch for operating one of the gear releasing means during the first portion of the time of operation of the releasing of the clutch, and means for actuating the gear shifting lever and moving the other gear releasing means to an inoperative and locked position.

44. In a gear changing mechanism for automobiles, a clutch, means for operating the clutch, a plurality of gear shifting levers normally holding the gears in neutral position, a plurality of gear releasing means for returning the gear shifting levers to neutral position, one of said gear releasing means being automatically operable, means operable upon the release of the clutch for operating the gear shifting levers, and means for selectively positioning the operating means for the gear shifting levers and the automatically operable gear releasing means in operative relation with the gear shifting levers.

45. In a gear changing mechanism for automobiles, the combination of a clutch, means for operating the clutch, a plurality of gear shifting levers normally holding the gears in neutral position and operable upon the release of the clutch, releasing means for returning the gear shifting levers to neutral position when the clutch is released, auxiliary gear releasing means operable under other conditions to return the gear shifting levers to neutral position, and means for locking said gear releasing means in that position.

46. In a gear changing mechanism for automobiles, the combination of a clutch, means for operating the clutch, a plurality of gear shifting levers normally holding the gears in neutral position, gear releasing means operable when the clutch is released to return the gear shifting levers to neutral position, auxiliary gear shifting means operable under other conditions to return the gear shifting levers to neutral position, means for locking said gear releasing means in that position, and means for releasing the locked gear releasing means.

47. In a gear changing mechanism for automobiles, a clutch, means for operating the clutch, a plurality of gear shifting levers normally holding the gears in neutral position and operable upon the release of the clutch, a plurality of gear releasing means for returning the gear shifting levers to neutral position, means operable upon the release of the clutch for moving a member of the gear releasing means to an inoperative position, means for locking said gear releasing means in said position, means for selectively positioning the said member of the releasing means, and means engageable with and operable by the selective means for releasing said member of the gear releasing means from its locked inoperative position.

48. In a gear changing mechanism for automobiles, a clutch, means for operating the clutch, a plurality of gear shifting levers normally holding the gears in neutral position and operable upon the release of the clutch, a plurality of gear releasing means for returning the gear shifting levers to neutral position, and cooperating means actuated upon the release of the clutch for operating the gear shifting levers and the gear releasing means, said cooperating means comprising a cam rotated upon the release of the clutch, and a finger adapted to be oscillated by the cam during a part of the time of rotation of the cam in one direction, the oscillation of the finger actuating one of the gear releasing means.

49. In a gear changing mechanism for automobiles, a clutch, means for operating the clutch, a plurality of gear shifting levers normally holding the gears in neutral position and operable upon the release of the clutch, a plurality of gear releasing means for returning the gear shifting levers to neutral position, cooperating means actuated upon release of the clutch for operating the gear shifting levers and the gear releasing means, said cooperating means comprising a cam rotated upon the release of the clutch, and a finger adapted to be oscillated by the cam during a part of the time of rotation of the cam in one direction, the oscillation of the finger actuating one of the gear releasing means, the other gear releasing means being actuated by a lever operable by the release of the clutch during the latter portion of the time of rotation of said cam.

50. In a gear changing mechanism for automobiles, a clutch, means for operating the clutch, gear shifting means, means operable upon the release of the clutch for actuating the gear shifting means, a gear releasing means normally active upon the release of the clutch for returning the gear shifting means to neutral position, an auxiliary gear releasing means adapted to be locked in an inoperative position, means for selectively positioning the means for actuating the gear shifting means, means engaged with the selective positioning means and adapted to be disengaged therefrom beyond the limit of effective operation of the selective positioning means for releasing the auxiliary gear releasing means from its locked position, and means for causing the means for releasing the auxiliary gear releasing means to automatically engage the selective means when said releasing means for the automatic gear releasing means has been returned to the limit of effective operation of the selective means.

51. In a gear changing mechanism for automobiles, a clutch, means for operating the clutch, gear shifting means adapted to normally hold the gears in neutral position, means operable upon the release of the clutch for actuating the gear shifting means, a gear releasing means actuated upon the release of the clutch for operating the gear shifting means to return a gear to neutral position, an auxiliary gear releasing means, means for selectively positioning the operating means for the gear shifting means relative thereto, said selective means comprising a rotatable shaft operatively connected to the means for operating the gear shifting means and provided with an actuating crank, a shaft mounted within the first-mentioned shaft and operatively connected with the auxiliary gear releasing means, and means for connecting the shafts for simultaneous operation, said last-mentioned means adapted to release the shafts whereby the second shaft may be rotated beyond the limits of effective operation of the selective means for causing the auxiliary gear releasing means to operate.

52. In a gear changing mechanism for automobiles, a clutch, means for operating the clutch, gear shifting means adapted to normally hold the gears in neutral position, means operable upon the release of the clutch for actuating the gear shifting means, a gear releasing means actuated upon the release of the clutch for operating the gear shifting means to return a gear to neutral position, an auxiliary gear releasing means, means for selectively positioning the operating means for the gear shifting means relative thereto, said selective means comprising a rotatable shaft operatively connected to the means for operating the gear shifting means and provided with an actuating crank, a shaft mounted within the first-mentioned shaft and operatively connected with the auxiliary gear releasing means, and means for connecting the shafts for simultaneous operation, said last-mentioned means adapted to release the shafts whereby the second shaft may be rotated beyond the limits of effective operation of the selective means for causing the auxiliary gear releasing means to operate, said connecting means for the shafts adapted to automatically lock the shafts for simultaneous movement when the second shaft has been rotated on its return movement to the limits of effective operation of the selective means.

In testimony, that I claim the foregoing as my own, I have hereto affixed my signature.

HIRAM CLIFTON DOOLIN.